(12) United States Patent
Belanger et al.

(10) Patent No.: US 9,089,810 B2
(45) Date of Patent: Jul. 28, 2015

(54) CYCLIC ADSORPTION PROCESS USING CENTRIFUGAL COMPRESSORS

(71) Applicants: Paul W. Belanger, Clarence Center, NY (US); Michael S. Manning, Buffalo, NY (US); Andrew C. Rosinski, Orchard Park, NY (US)

(72) Inventors: Paul W. Belanger, Clarence Center, NY (US); Michael S. Manning, Buffalo, NY (US); Andrew C. Rosinski, Orchard Park, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 154 days.

(21) Appl. No.: 14/053,636

(22) Filed: Oct. 15, 2013

(65) Prior Publication Data

US 2014/0041521 A1    Feb. 13, 2014

Related U.S. Application Data

(62) Division of application No. 13/368,403, filed on Feb. 8, 2012, now Pat. No. 8,623,118.

(51) Int. Cl.
*B01D 53/047* (2006.01)
*F01D 17/00* (2006.01)
*B01L 9/00* (2006.01)

(52) U.S. Cl.
CPC .......... *B01D 53/047* (2013.01); *B01D 53/0476* (2013.01); *B01D 2256/12* (2013.01); *B01L 9/54* (2013.01)

(58) Field of Classification Search
CPC .. B01D 53/04; B01D 53/047; B01D 53/0473; B01D 53/0476; B01D 2256/12; B01L 9/54
USPC ........... 95/26, 96, 130; 96/109, 115, 116, 121
See application file for complete search history.

(56) References Cited

U.S. PATENT DOCUMENTS

| | | | |
|---|---|---|---|
| 4,605,425 | A | 8/1986 | Verrando et al. |
| 5,555,749 | A | 9/1996 | Wehrman et al. |
| 5,989,313 | A | 11/1999 | Mize |
| 7,455,717 | B2 | 11/2008 | Sprinkle |
| 7,585,351 | B2 | 9/2009 | Deane et al. |
| 7,771,511 | B2 | 8/2010 | Dolensky |
| 7,785,405 | B2 | 8/2010 | Manning et al. |
| 7,789,939 | B2 | 9/2010 | Blouin |
| 7,867,320 | B2 | 1/2011 | Baksh et al. |
| 2011/0277629 | A1 | 11/2011 | Manning et al. |
| 2011/0315009 | A1 | 12/2011 | Ambriano et al. |
| 2013/0125746 | A1* | 5/2013 | Manning et al. ................ 95/19 |
| 2013/0323082 | A1* | 12/2013 | Rosinski et al. ............... 417/19 |

* cited by examiner

*Primary Examiner* — Frank Lawrence
(74) *Attorney, Agent, or Firm* — Salvatore P. Pace

(57) ABSTRACT

A cyclic adsorption process is provided, the process containing one or more adsorber vessels undergoing the steps of at least pressurization and depressurization and driven by one or more variable speed centrifugal machines operating under acceleration and deceleration conditions and adjusted to the steps, vessel size, and process conditions employed, wherein the process cycle time is greater than the ratio of the change in inertia, defined the maximum energy that can be lost during a cycle due to inertia changes, to 0.3 times the total power of the one of more centrifugal machines that would be consumed in the absence of inertial effects.

13 Claims, 3 Drawing Sheets

CYCLIC ADSORPTION PROCESS USING CENTRIFUGAL COMPRESSORS

RELATED APPLICATIONS

This application is a divisional application of U.S. patent application Ser. No. 13/368,403, filed on Feb. 8, 2012 and now issued as U.S. Pat. No. 8,623,118, which is a continuation-in-part of U.S. patent application Ser. No. 13/168,264, filed on Jun. 24, 2011 and now abandoned, which are incorporated by reference herein.

FIELD OF THE INVENTION

The present invention provides an improved cyclic adsorption system and process for separating components of a gas stream using centrifugal machines. More particularly, the present invention is directed to adsorption processes using one or more variable speed driven centrifugal compressors operating under cyclic acceleration and deceleration conditions wherein the process cycle time is selected to minimize the compressor power consumption and maximize the efficiency of the process.

BACKGROUND OF THE INVENTION

Cyclic adsorption processes are well know and are typically used to separate a more absorbable component gas from a less absorbable component gas. Examples include pressure swing adsorption (PSA) or vacuum pressure swing adsorption (VPSA) processes which use a low pressure or a vacuum and a purge gas to regenerate the sorbent and temperature swing adsorption (TSA) processes which uses a thermal driving force such as a heated purge gas to desorb the impurities. Such processes are generally used to separate oxygen or nitrogen from air, other impurities like hydrocarbons and/or water vapor from feed air gases, hydrogen from carbon monoxide, carbon oxides from other gas mixtures, and the like. These processes are also used to remove impurities such as water vapor and hydrocarbons from air prior to cryogenic air separation. Any cyclic adsorption system for separating or purifying gas components can be used.

For illustrative purposes, a typical VPSA process for separating oxygen from air is described herein although the present invention can be employed with other cyclic adsorption processes using centrifugal compressors and is not intended to be limited to this process. The typical cyclic VPSA process is one wherein an adsorber bed undergoes the following stages:

1. The adsorber bed is pressurized to a desired pressure wherein nitrogen is readily adsorbed by the adsorbent as the feed air is passed across the bed;
2. Product gas rich in oxygen is produced as the nitrogen in the feed air is adsorbed;
3. The bed containing the adsorbent is evacuated to a low pressure (typically under vacuum) wherein the adsorbed nitrogen is desorbed from the adsorbent in the adsorber bed; and, preferably,
4. A purge gas is passed through the bed to remove any remaining nitrogen.

The cycle time is understood by the skilled person to mean the amount of time needed to complete one cycle; e.g. the process steps in order and then return to the starting condition.

Some adsorption processes will have more steps or multiple beds and often use one or more blowers for each of the pressurization and depressurization steps. If the VPSA plant contains two or more adsorber vessels, each vessel undergoes the above steps; however, the two vessels are operated out of phase so that while one vessel is producing product the other is being regenerated. Also, in a two bed process two blowers are typically used wherein one is dedicated to feeding gas to the adsorber vessels while the other dedicated to evacuating the adsorber vessels.

Regardless of whether a single vessel, two vessels, or even more vessels are used, the pressures and flows within the process change quickly as the process cycles from adsorption to desorption. Generally, the pressure of a vessel will change from a low pressure condition of at or below atmospheric, preferably below atmospheric, such as about 6 to 8 psia, to a high pressure condition of above atmospheric, such as about 19 to 24 psia, in a rapid periodic cycle time, such as less than one minute. Some adsorption processes will require even wider spans of pressures and/or vacuums in similar rapid cycle times.

Traditionally, VPSA plants use positive displacement machines such as rotary lobe type blowers operating at fixed speeds to move gas through the process. These machines are robust and generally do not experience any significant operational problems as the pressures and flows change and reverse. However, these machines have low power efficiency and conventional machines are only 60-65% efficient. About 35-40% of the energy supplied to these machines is therefore wasted. Thus, it is clearly desirable to replace the traditional rotary lobe machine with a more efficient machine capable of meeting the rigorous requirements of rapid cyclic conditions.

One such machine is a centrifugal compressor driven by a direct drive variable, high speed permanent magnet motor or a variable, high speed induction motor. Such compressors have a known efficiency of approximately 85%. The challenge involved in the use of such a compressor is that its performance is very sensitive to changes in pressure, such as the rapid pressure changes that occur during a pressure swing adsorption process. Centrifugal compressors used in rapid cyclic processes like the adsorption process described herein are highly susceptible to frequent adverse operating conditions or states known as surge and stonewall as are more fully described below. Such conditions can result in both low power efficiency and damage or failure to the compressor impeller and other compressor or system components and have therefore been avoided in practice. Thus, it is necessary to manage the adverse conditions of surge and stonewall if one is to succeed in replacing positive displacement machines with more efficient centrifugal machines in cyclic adsorption processes.

Centrifugal compressors have been proposed for use in adsorption processes. For example, U.S. Pat. No. 5,555,749 suggests the use of centrifugal compressors in adsorption systems during the exhaust portion (depressurization) of the cycle. U.S. Pat. No. 7,785,405B2 discloses systems and processes for gas separation using high-speed permanent magnet variable-speed motors to accelerate and decelerate centrifugal compressors used in pressure swing adsorption (PSA) or vacuum pressure swing adsorption (VPSA) processes. These patents do not teach a process in which the optimal cycle time is selected to realize the power benefits from the use of such compressors.

BRIEF SUMMARY OF THE INVENTION

The present invention provides an improved process, and system for the use of centrifugal machines in cyclic adsorption processes. This invention provides a method for realizing the power benefits of using centrifugal machines in place of conventional positive displacement machines by minimizing the adverse condition of stonewall associated with the rapid decreases in head pressure associated with the sudden outflow or inflow of gas into the vessel during certain steps of the process. Although centrifugal machines are known to be more efficient than conventional positive displacement machines, the power advantages are not realized when used in such cyclic processes operating under acceleration and deceleration conditions unless the process cycle time is adjusted to be more than a predetermined value calculated based on the moment of inertia of the centrifugal impeller and other moving parts. By adjusting the adsorption process to use longer cycle times, stonewall can be minimized and the efficiency of the centrifugal machines can be more fully realized.

In other words and as more fully explained below, the energy used by the machine during operation is the energy needed to compress the process gas from suction pressure to discharge pressure plus the energy needed to increase the speed of the compressor impeller (including rotor and other moving parts) from a low operating speed to a high operating speed for the period needed to accomplish the required process steps. It has now been discovered that for a given centrifugal machine operating under acceleration/deceleration conditions, the energy needed to overcome the moment of inertia will always be fixed. Thus, the ratio of inertial energy per cycle time (or inertial power) relative to total production rate is minimized to achieve optimal operation of the centrifugal machine.

According to one embodiment of this invention, a cyclic adsorption process is provided comprising one or more adsorber vessels undergoing the steps of at least pressurization, depressurization, and purge in the cycle and driven by one or more variable speed centrifugal machines operating under acceleration and deceleration conditions adjusted to the steps, vessel size, and the process conditions employed, the improvement comprising operating the process such that the cycle time is greater than the ratio of the $\Delta_{inertia}$ to 0.3 times the total power of the one of more centrifugal machines that would be consumed in the absence of inertial effects.

According to another embodiment of this invention, a method is provided for improving the power efficiency of a cyclic adsorption process using a positive displacement machine containing one or more adsorber vessels undergoing the steps of at least pressurization and depressurization comprising replacing the positive displacement machine with a variable speed centrifugal machine; operating the centrifugal machine under acceleration and deceleration conditions adjusted to the steps, adsorber vessel size, and process conditions employed; and adjusting the process cycle time to be greater than the ratio of the calculated $\Delta_{inertia}$ to 0.3 times the centrifugal machine power consumption in the absence of inertial effects.

In yet another embodiment of this invention, a pressure-swing adsorption process is provided for cycling between a high pressure condition and a low pressure condition and wherein the cycle includes at least pressurization and depressurization steps, the process comprising cyclically operating at least one variable speed centrifugal compressor being in fluid communication with at least one adsorber vessel to accelerate from a low operating speed to a high operating speed to obtain the high cycle pressure condition and to decelerate from high operating speed to low operating speed to obtain the low cycle pressure condition whereby the cycle time is adjusted such that the centrifugal compressor is in a stonewall condition for a period of not more than 40 percent of the cycle time of the process under the conditions employed.

In still another embodiment, a method of using at least one centrifugal compressor for both the pressurization and depressurization steps of an adsorber vessel used in a pressure swing or vacuum swing adsorption process is provided wherein the compressor is adjusted to the specific steps, adsorber vessel size, and process conditions employed, the method comprising:

using a variable frequency drive to control the motor driving the centrifugal compressor from a low operating speed of not more than 7000 RPM to a high operating speed of greater than at least 13000 RPM;

operating the compressor cyclically to accelerate from the low operating speed to a high operating speed and decelerate from high operating speed to low operating speed as required by the process for a period of not less than the ratio of the $\Delta_{inertia}$ to 0.3 times the centrifugal compressor and motor power consumption rating in the absence of inertial effects;

and wherein the compressor is in a stonewall condition for not more than 40 percent of the total cycle time of the process under the conditions employed.

DETAILED DESCRIPTION OF THE INVENTION

Figure 1:
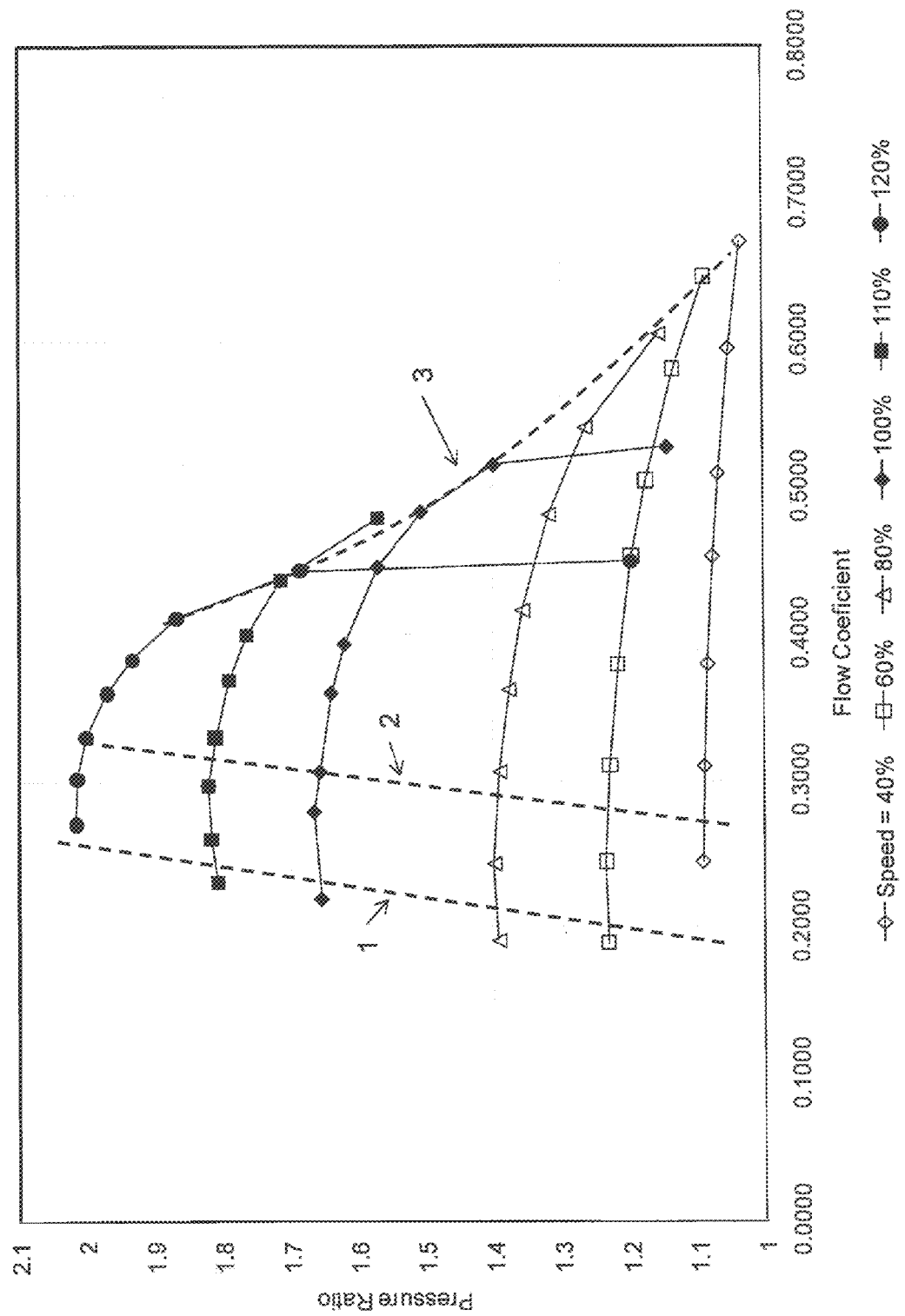
FIG. 1 is a graph showing a centrifugal compressor map with curves indicating the flow generated by the centrifugal machine for various operating speeds and pressure ratios across the machine.

As described above, the present invention provides an improved system and process for the use centrifugal compressors in cyclic adsorption processes. This system and process uses centrifugal compressors driven by variable, high speed motors to replace conventional positive displacement machines and more specifically rotary lobe blowers/compressors to minimize power consumption and maximize process efficiency. Further, the selection of cycle time minimizes the occurrence of stonewall found to result from the use of such centrifugal compressors in these rapid cyclic adsorption processes.

This invention is directed to cyclic fluid separation processes and particularly to cyclic adsorption processes having at least one vessel containing at least one adsorbent bed therein (herein an "adsorber bed" or "adsorber vessel"). Examples of commercial systems include, but are not limited to, PSA and VPSA processes and systems wherein an adsorbent bed is used to separate a less absorbable component from a more absorbable component.

Conventional cyclic adsorption systems will typically have at least one adsorbent bed that is cyclically pressurized by at least one positive displacement feed compressor and sometimes evacuated by at least one such vacuum compressor. In the present invention, one centrifugal machine, designed for variable-speed operation, is used for both pressurization and depressurization of a single adsorber bed and multiple bed systems will have separate centrifugal machines; one for feeding gas to the vessels and one for evacuating the vessels. These machines offer improved process efficiencies through their reduced operating power requirements when used with adsorber vessels that are large enough to result in process cycle times of not less than the ratio of $\Delta_{inertia}$ to 0.3 times the centrifugal compressor power that would be consumed in the absence of inertial effects.

Centrifugal compressors driven by variable, high speed motors are known and have been proposed for use in adsorption processes by the present assignee as taught in U.S. Pat. No. 7,785,405B2 which is fully incorporated by reference herein. Centrifugal compressors, sometimes referred to as radial compressors, are considered a sub-class of dynamic axisymmetric work-absorbing type turbo machinery. These machines are well known although their application in cyclic adsorption process has only been proposed recently. Centrifugal machines typically operate at high speeds and generate high pressure rises. The term "machines" is used herein to describe the operating machine which includes the compressor/blower and the motor drive system.

The centrifugal compressors are preferably driven by direct drive variable, high speed permanent magnet motors having variable frequency drives which permit the compressor to cyclically accelerate from a low operating speed to a high operating speed and decelerate from high operating speed to low operating speed at rapid rates as required by current PSA or VPSA cycle times, such as less than a minute. These motors are capable of operating the compressors at speeds greater than 5000 RPM, preferably greater than 10,000 RPM, and most preferably greater than 15,000 RPM. Preferably, for VPSA and PSA processes, the low operating speed will be not more than 7000 RPM and the high operating speed will be greater than 13,000 RPM.

As used herein, the term "centrifugal machines" is intended to include centrifugal compressors driven by high speed induction motors, also known as rotating transformers or asynchronous motors. An induction motor is a type of alternating current motor where power is supplied to the rotor by means of electromagnetic induction. The electric motor turns because of the magnetic force exerted between the stationary electromagnet, the stator, and the rotating electromagnet, the rotor.

The compressors used in the inventive process can have single or multiple stages, can have various impellers or blade configurations, can be configured to operate in association with one or more beds and can be used in combination with other positive displacement machines. However, one compressor is typically used per service and, in one embodiment herein, the compressor is used in the absence of a positive displacement machine. The centrifugal machine is selected such that its efficiency is at least 10% greater than the efficiency of a conventional positive displacement machine used in the same application.

FIG. 1 is a graph illustrating how the centrifugal compressor operates at various operating speeds and pressures during a typical VPSA oxygen process. The curves demonstrate the operating conditions that will result in surge, stonewall, and optimal efficiency. Again, the VPSA process is used only for illustrative purposes. As shown in FIG. 1, Line 1 is the surge line, Line 2 is the best efficiency line, and Line 3 is the stonewall line. The flow coefficient is 0.3 (the flow coefficient is a dimensionless number that can be used to calculate the mass flow) at a speed that is 100% of the design speed and a pressure ratio across the compressor of 1.65. If the compressor is maintained at 100% of design speed and the pressure ratio across it suddenly drops to 1.6, then the flow coefficient will be 0.43 representing a 40% increase in flow. For every choice of operating speed there is a fixed relationship between the pressure rise across the compressor and the flow that the compressor can produce.

At the left of Line 1 in FIG. 1 is a condition known as "surge". The surge point is defined herein as the minimum stable flow rate for a given pressure rise across the centrifugal compressor. If the flow rate decreases beyond this point, then the head pressure developed by the compressor decreases causing a reverse pressure gradient at the compressor discharge and a resulting backflow of gas. Once the pressure in the discharge line of the compressor drops below the pressure developed by the impeller, the flow reverses once again. This alternating flow pattern has been found to be an unstable condition that can result in serious damage to the compressor impeller, drive mechanism and components. This condition must be avoided.

On the right of Line 3 is a condition known as "stonewall". Stonewall is defined herein as a condition where the compressor fails to develop any pressure head because the volumetric flow through the compressor is too high for a given rate of impeller rotation. Thus, a further reduction in pressure ratio does not result in additional flow. Although this condition will not damage the impeller, the power efficiency of the compressor will be lowered. The occurrence of stonewall or a stonewall condition should be minimized in order to ensure that it does not negate the power benefits created by replacing the rotary lobe type blower with the more efficient centrifugal compressor. Preferably, the cycle time is selected so that the compressor is in a stonewall condition for not more than 40 percent, and preferably less than 30%, of the total cycle time of the process.

As the pressure inside an adsorber vessel changes, the operating speed of the centrifugal compressor must be changed. The maximum efficiency can be realized by maintaining the compressor slightly to the right (on FIG. 1) of its surge condition. For example and again referencing FIG. 1, it is shown that at a pressure ratio across the compressor of 1.4, the compressor should be operated at 80% of its design speed. Generally, it is theoretically possible to control the speed of the compressor to maintain optimal efficiency while avoiding surge and stonewall conditions. However, during points in time within the process when the pressure ratio suddenly drops, it is effectively impossible to completely avoid stonewall conditions. Although the compressor speed can be suddenly increased by adding power to the compressor motor, the only means of slowing the impeller down is to allow it to naturally coast down as it does work on the gas or fluid that is being compressed.

Figure 2:
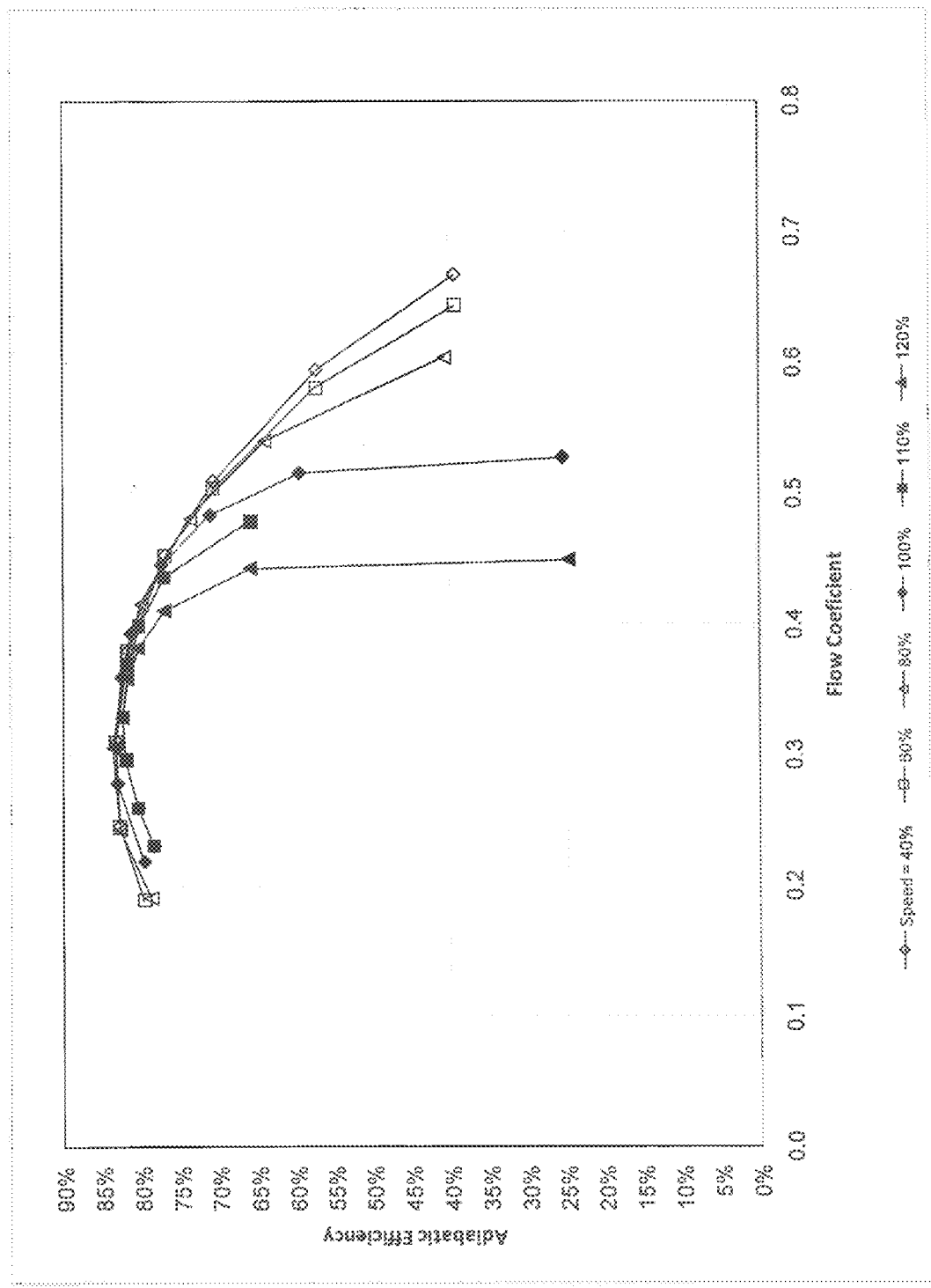
FIG. 2 is a graph showing a map of compressor efficiency as a function of operating speeds and pressure ratios across the machine.

The optimal efficiency line, shown in FIG. 1 as Line 2, is a relationship between operating speed and pressure ratio that maximizes the efficiency of the machine. FIG. 2 shows how efficiency varies as a function of pressure ratio and speed of operation. The graph shows that for each operating speed the efficiency is at a maximum value, close to 85%, when the flow coefficient is approximately 0.3. The optimum flow will vary with speed. At very low operating speed the optimal flow coefficient is 0.28 while at very high operating speed the optimal flow coefficient is 0.32. The optimal points on the graph of FIG. 2 translate directly into the optimal operating line shown in FIG. 1 as Line 2.

Figure 3:
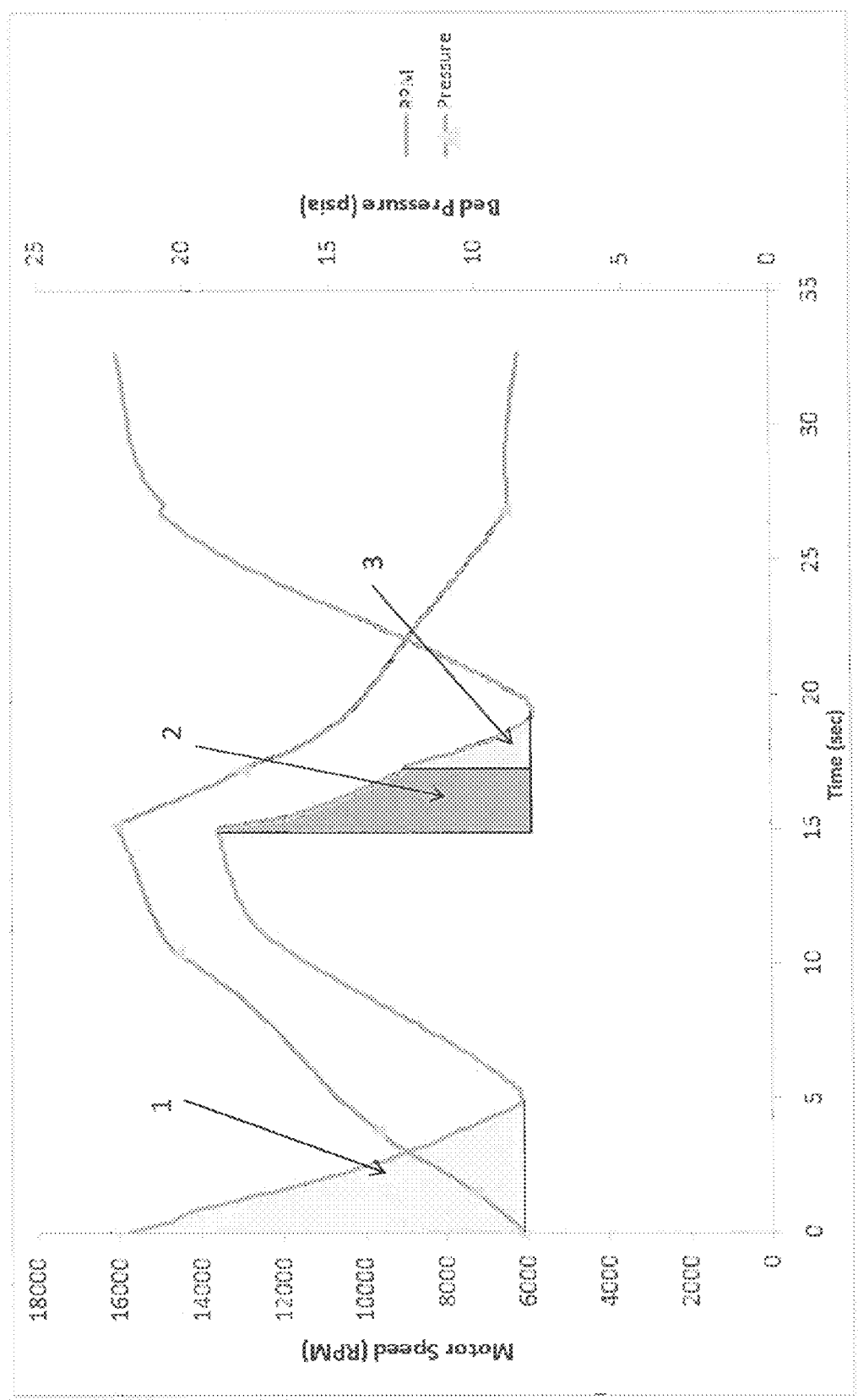
FIG. 3 is a graph using data from a VPSA cycle using a centrifugal machine.

FIG. 3 is a graph showing the bed pressures inside the adsorber bed and the speed of the centrifugal compressor driven by a direct drive variable, high speed permanent magnet motor during a full cycle for an actual VPSA process for the separation of oxygen from air. This cycle included pressurization, depressurization, equalization, evacuation, and purge steps. A single centrifugal compressor was used which produced a flow of 7000 ACFM (Actual Cubic Feet Per Minute) at an operating speed of 13,500 RPM. The graph in FIG. 3 contains a curve (represented by the line with triangles) showing how the adsorber vessel pressure changed as a function of time. Another curve (represented by the line without triangles) illustrates how the centrifugal machine speed varied with time to match the changing pressure within the adsorber vessel. The shaded areas (identified by arrows 1, 2 and 3) represent inertial energy losses of the compressor. The first shaded area (1) is during the period of adsorber bed pressurization and the second shaded areas (2 and 3) are during the period of adsorber bed depressurization. At the very beginning of the cycle, the bed has just been purged and it is at a very low pressure. The compressor speed is very high at this point since it is used to maintain the low pressure (high pressure ratio across the compressor). A set of valves within the system is now switched so that the compressor can be used to feed atmospheric air to the adsorber vessel. The sudden change of pressure at the suction of the compressor from a vacuum to an ambient condition and change in pressure at the discharge of the compressor from an ambient to a vacuum condition results in a sudden reduction in the pressure ratio across the compressor (e.g. from 2 to 0.5) This change puts the compressor in the stonewall condition. As air flows through the compressor, it coasts down in speed and the adsorber bed gradually increases in pressure. As the compressor coasts down in speed, the inertial energy of the impeller, motor rotor and shaft provide the energy needed to compress the gas into the adsorber vessel. Stonewall is a very low efficiency condition resulting in a low amount of the inertial energy, such as less than ½ in the compressor used during this example, being used to compress gas with the rest of the energy being wasted.

Once the compressor impeller sufficiently reduces speed to cause the system to exit the stonewall condition, energy is supplied to the compressor to increase its speed to match the increasing pressure in the adsorber vessel. The speed reaches a peak point in the process as the adsorber vessel reaches the pressure at which the oxygen product gas can be produced (or, for other processes, the less absorbable gas). Once the adsorber vessel becomes saturated with nitrogen (or the more absorbable gas), it is subsequently blown down. During this blow down step (2), the centrifugal compressor is allowed to coast down in speed as it moves air (or other feed gas) from the feed side of the system through a vent as the pressure in the adsorber vessel is relieved through another valve. The air is vented to the atmosphere or, in the case or other processes, otherwise captured as required. During this period of the cycle, 100% of the change in inertial energy of the impeller is lost without doing any useful work. It should be noted that the work is lost whether the process uses a centrifugal compressor or a conventional rotary lobe blower although the losses for the centrifugal compressor are higher because the flow of gas through the centrifugal compressor is much higher than through the rotary lobe blower.

After the adsorber vessel reaches atmospheric pressure, the compressor is used to pull the adsorber vessel down to a deep vacuum state. At first the compressor is in a stonewall condition and continues to coast down in speed as gas is removed from the vessel. Once the speed of the compressor is low enough and the pressure ratio across it is high enough, the compressor comes out of it's stonewall condition. Power is now supplied to the compressor to further evacuate the adsorber vessel.

As shown in the shaded areas of FIG. 3, a considerable amount of time is spent with the compressor in a stonewall condition and the power loss is appreciable. It was estimated that the wasted power corresponding to the lightly shaded portions of the cycle shown in FIGS. 3 (1 and 3) represent up to 15% of the total power consumption. Another 4.5% of total system power is wasted during the more darkly shaded portion (2) of the process shown in FIG. 3. Given that the switch from a conventional positive displacement type machine to a centrifugal machine can save up to 30% of the total power consumption in a typical VPSA oxygen process (85% efficiency vs. 65% efficiency), it is imperative to minimize the inertial energy lost due to compressor stonewall to maximize the power benefits received from the centrifugal machine.

The invention described herein involves selecting the adsorption process cycle, such as the VPSA process cycle as illustrated, in such a way that the inertial energy lost due to compressor stonewalling is small relative to the total amount of energy supplied to the system. This is done by increasing the duration of the overall process cycle, which is accomplished by increasing the size of the adsorber vessels relative to the size of the centrifugal compressor(s). This is contrary to the current direction of vessels and cycle design which has recently focused on smaller beds and faster cycles. It has therefore been surprisingly found that cyclic adsorption systems using centrifugal compressors are not more energy efficient than current systems using positive displacement type blowers without adjusting such systems to have sufficiently long process cycle times.

Although not wanting to be bound to theory, this requirement can be explained by referring again to FIG. 3. It is believed that this limitation in efficiency is shown where the moment of inertia of the impeller and motor rotor is calculated to be 0.28 kg*$^2$ based on the materials of construction and geometry of the centrifugal impeller and motor rotor. The inertial effects are the calculated amount of resistance to change in velocity which is caused by the spinning weight (or mass) of the impeller and motor rotor. This can be calculated by one skilled in the art from the design and operating specifications of the machines.

At the start of feed it is known that the impeller will coast down in speed from about 16,500 RPM to about 6600 RPM as can be seen in FIG. 3. During this time, the inertial energy of the compressor goes from 420 kJ to 67 kJ for a total reduction in energy of 353 kJ. Similarly during blowdown and the start of evacuation it is known that the impeller will coast down in speed from about 13,500 RPM (the design speed referenced above) to about 5,400 RPM. During this period, the inertial energy of the compressor goes from 277 to 44 kJ for a total change of 233 kJ. As shown, the total change in inertial energy during the two coasting down periods over a typical VPSA cycle is 586 kJ. This has now been discovered to be an important machinery design parameter that can be calculated for any selected motor plus centrifugal impeller (moving parts) and knowledge of the maximum and minimum speeds of operation during cyclic operation. This parameter, change in inertia, is defined herein as $\Delta_{inertia}$ and represents the maximum possible energy that can be lost during a cycle due to inertia changes. Once the centrifugal compressor and motor is selected, the inertial energy per cycle ($\Delta_{inertia}$) is fixed and constant regardless of the duration of the overall cycle. Although the above example demonstrates the calculation of $\Delta_{inertia}$ for one specific system, a general formulation can be used to determine $\Delta_{inertia}$ for any system. Such a formulation is well known in the field of Physics and is provided below:

$$KE_{max} = \frac{1}{2} \cdot I \cdot \omega_{max}^2$$

$$KE_{min} = \frac{1}{2} \cdot I \cdot \omega_{min}^2$$

$$\Delta_{inertia} = KE_{max} - KE_{min}$$

In the above formulas, I is the moment of inertia of the rotor, shaft, and impeller around the axis of rotation, $\omega_{max}$ and $\omega_{min}$ are the maximum and minimum speeds of rotation of the rotor, shaft, and impeller expressed in radians per unit time, and $KE_{max}$ and $KE_{min}$ are the kinetic energy of rotation of the rotor, shaft, and impeller.

Once $\Delta_{inertia}$ is known for a given compressor/motor design, it is possible, with a knowledge of the particular process cycle time, to calculate the power penalty associated with inertial energy losses. This is determined by dividing the inertial energy loss by the cycle time, represented by the formula:

$$P_{inertia} = \frac{\Delta_{inertia}}{CT}$$

In the above example for the VPSA process, the total inertial power loss is 17.7 kW (calculated as 586 kJ/cycle divided by a cycle time of 33.2 seconds). In practice the actual inertial power loss will be slightly less than this number because a small portion of the energy does useful work on the gas. Notwithstanding, the loss will be small enough not to have a significant impact on the above expression.

The total power consumed by the centrifugal compressor will be the theoretical power that would be consumed absent inertial effects+the inertial losses resulting from stonewall operation is represented by the formula:

$$P_{cent} = P_{noinertia} + P_{inertia} = P_{noinertia} + \frac{\Delta_{inertia}}{CT}$$

The value of $P_{noinertia}$ will not depend upon the geometry of the compressor or the selection of cycle time as is the case for $P_{inertia}$. It will be a linear function of plant capacity. In the example above, a commercial scale VPSA plant was operated to produce 12.5 tons of oxygen per day. The measured power consumption was 90 kW. This was the total power consumption including inertial losses. Since the calculated inertial power loss was 17.7 kW, the above formula provides the power consumption of the centrifugal compressor absent inertial effects $P_{noinertia}$=72.3 kW. Expressing this as a function of plant capacity results in a specific power consumption (absent inertial effects) of $P_{noinertia}$=5.8 kW/TPD, a relationship that can be used to calculate $P_{noinertia}$ for any sized plant (multiply 5.8 kW by the plant design capacity in per tons per day (TPD)). Thus, $P_{noinertia}$ is equal to 5.8 kW per (US short) TPD of plant capacity (907.2 kilograms per day) which is a common production flow rate used in the industrial gas industry.

As was stated above, it is critical to select a cycle time of sufficient duration to ensure that the process using the centrifugal compressor is at least as energy efficient as the process using the conventional blower (hereinafter a rotary lobe type blower), preferably more efficient.

It is known that the power consumed by a process using a rotary lobe blower will be 1.3 times higher than a process using a centrifugal compressor with no inertial effects. In other words, the 85% adiabatic efficiency for the centrifugal compressor is divided by the 65% adiabatic efficiency for the rotary lobe blower resulting in a power ratio of 1.3. Thus, to ensure that the power consumption when using a centrifugal compressor is less than what would result from using a rotary lobe type blower, the following equation must hold true:

$$1.3 \cdot P_{noinertia} > P_{noinertia} + \frac{\Delta_{inertia}}{CT}$$

Simplifying and rearranging for minimum cycle time yields:

$$CT > \frac{\Delta_{inertia}}{0.3 \cdot P_{noinertia}}$$

In this example, the selection of compressor resulted in a $\Delta_{inertia}$ of 586 kJ/cycle. The centrifugal compressor power, absent inertial effects, was 72.3 kW.

Referring again to the equations, the minimum cycle time resulting in a power benefit using a centrifugal compressor in place of a rotary lobe type blower in this example is 27 seconds. It can now be determined that any cycle time less than this value results in power consumption that is higher than for a rotary lobe type blower in this process. Preferably, when used in a cyclic adsorption process, the total power required for the centrifugal machine is selected to be at least 10% less than the power required for a positive displacement machine when used in the same process.

Because the above example is fairly typical of a VPSA process design and using the best variable speed centrifugal compressor design adapted for this VPSA process, it can be concluded that a cycle time of at least 27 seconds is required in order to ensure that the use of a centrifugal compressor results in a net energy savings relative to a conventional rotary lobe type blower.

While the above examples were calculated using a typical VPSA process for the separation of oxygen from air, it is believed that these same findings can be employed for any cyclic adsorption process using one or more centrifugal compressors for rapid pressurizing and/or depressurizing. This includes adsorption processes using multiple adsorber beds and having any bed or vessel configuration such as radial or axial configurations.

It should be apparent to those skilled in the art that the subject invention is not limited by the examples provided herein which have been provided to merely demonstrate the operability of the present invention. The selection of adsorption process, process conditions, cycle times, and adsorber vessel size can be determined by one skilled in the art from the specification without departing from the spirit of the invention as herein disclosed and described. The scope of this invention includes equivalent embodiments, modifications, and variations that fall within the scope of the attached claims.

What is claimed is:

1. A cyclic adsorption system having at least one vessel containing at least one adsorbent bed therein for receiving a feed gas at a pressure wherein during a cycle at least one more readily adsorbed gas in the feed gas is adsorbed by the adsorbent as the feed gas is passed across the bed producing a product gas rich in at least one less readily adsorbed gas and evacuating the at least one vessel to a lower pressure whereby the at least one more readily adsorbed gas is desorbed from the adsorbent bed, wherein the cycle is driven by one or more variable speed centrifugal machines driven by a direct drive variable high-speed permanent magnet motor having a variable frequency drive and designed to accelerate from a low operating speed to a high operating speed to obtain a cycle pressure condition and then to decelerate from high operating speed to a low operating speed to obtain a lower cycle pressure condition and the cycle time is controlled such that the one or more centrifugal machines is in a stonewall condition for a period of not more than 40 percent of the cycle time under the conditions employed.

2. The system of claim 1 wherein the system is designed to accelerate from a low operating speed to a high operating speed to obtain a high cycle pressure condition and to decelerate from high operating speed to a low operating speed to obtain a low cycle pressure condition.

3. The system of claim 2 wherein the high pressure condition is 19 to 24 psia and the low pressure condition is 6 to 8 psia.

4. The system of claim 3 wherein the adsorption system is designed to conduct a VPSA or PSA process.

5. The system of claim 4 wherein the VPSA or PSA process is for the production of oxygen from air.

6. The system of claim 1 wherein the one or more centrifugal machines is in a stonewall condition for a period of less than 30% of the cycle time.

7. The system of claim 1 wherein the process cycle time of at least 27 seconds.

8. A system designed for conducting an adsorption process for separating a more absorbable component gas from a less absorbable component gas comprising at least one variable speed centrifugal compressor being in fluid communication with at least one adsorber vessel and capable of accelerating from a low operating speed to a high operating speed and decelerating from high operating speed to low operating speed during the process cycle wherein the cycle time is controlled such that the centrifugal compressor is in a stonewall condition for a period of not more than 40 percent of the cycle time under the conditions employed.

9. The system of claim 8 wherein the centrifugal compressor is driven by a direct drive variable high-speed permanent magnet motor having a variable frequency drive.

10. The system of claim 8 wherein the accelerating from a low operating speed to a high operating speed obtains a first cycle pressure condition and the decelerating from high operating speed to a low operating speed obtains a lower cycle pressure condition.

11. The system of claim 10 wherein the first pressure condition is 19 to 24 psia and the lower pressure condition is 6 to 8 psia.

12. The system of claim 8 wherein the size of the adsorber vessels relative to the size of the centrifugal compressor is adjusted to support a cycle time of sufficient duration to ensure that the process using the centrifugal compressor is at least as energy efficient as the process using the conventional blower.

13. The system of claim 12 wherein the process cycle time of at least 27 seconds.

* * * * *